(12) United States Patent
Pomerantz

(10) Patent No.: US 7,865,798 B2
(45) Date of Patent: *Jan. 4, 2011

(54) REDUNDANT STORAGE OF COMPUTER DATA

(75) Inventor: Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/037,980

(22) Filed: Feb. 27, 2008

(65) Prior Publication Data

US 2008/0155195 A1    Jun. 26, 2008

Related U.S. Application Data

(63) Continuation of application No. 11/136,660, filed on May 24, 2005, now Pat. No. 7,360,143.

(51) Int. Cl.
 *H03M 13/00* (2006.01)
(52) U.S. Cl. ....................................... 714/752; 714/786
(58) Field of Classification Search ................. 714/752, 714/786
 See application file for complete search history.

(56) References Cited

U.S. PATENT DOCUMENTS

| | | | | |
|---|---|---|---|---|
| 5,848,230 A | * | 12/1998 | Walker ........................... | 714/7 |
| 5,859,965 A | * | 1/1999 | Gittins et al. ................. | 714/52 |
| 6,418,539 B1 | * | 7/2002 | Walker ........................... | 714/5 |
| 6,795,898 B2 | * | 9/2004 | Weinreb et al. ............. | 711/119 |
| 6,823,425 B2 | | 11/2004 | Ghosh et al. | |
| 6,834,326 B1 | * | 12/2004 | Wang et al. .................. | 711/114 |
| 7,073,115 B2 | * | 7/2006 | English et al. ............... | 714/770 |
| 7,080,278 B1 | * | 7/2006 | Kleiman et al. ................ | 714/6 |
| 7,093,182 B2 | * | 8/2006 | Dickson ...................... | 714/770 |
| 7,213,102 B2 | * | 5/2007 | Buchanan et al. ........... | 711/114 |
| 7,467,281 B2 | * | 12/2008 | Edirisooriya ................ | 711/202 |
| 2002/0019844 A1 | | 2/2002 | Kurowski et al. | |
| 2002/0144058 A1 | | 10/2002 | Burger et al. | |
| 2002/0156974 A1 | | 10/2002 | Ulrich et al. | |
| 2002/0199017 A1 | | 12/2002 | Russell | |
| 2003/0115518 A1 | | 6/2003 | Kleveland et al. | |
| 2003/0126247 A1 | | 7/2003 | Strasser et al. | |
| 2003/0182435 A1 | | 9/2003 | Redlich et al. | |
| 2004/0003272 A1 | | 1/2004 | Bantz et al. | |
| 2004/0153481 A1 | | 8/2004 | Talluri | |
| 2004/0225834 A1 | | 11/2004 | Lu et al. | |
| 2004/0257203 A1 | | 12/2004 | Maltsev et al. | |
| 2004/0267757 A1 | | 12/2004 | Kobayashi et al. | |
| 2004/0267827 A1 | | 12/2004 | Chang et al. | |
| 2005/0210358 A1 | | 9/2005 | Chouly et al. | |

OTHER PUBLICATIONS

Wylie, et al.; Survivable Information Storage Systems; Aug. 2000; pp. 61-68; 0018-9162@2000 IEEE; US.
Darpa ISO Sponsored Research; 1999 Project Summary; PASIS Carnegie Mellon University; Pittsburgh; US.

* cited by examiner

*Primary Examiner*—Esaw T Abraham
(74) *Attorney, Agent, or Firm*—Edward J. Lenart; Justin Dillon; Biggers & Ohanian, LLP.

(57) ABSTRACT

Redundant storage of computer data including encoding N data values through M linear expressions into M encoded data values and storing each encoded data value separately on one of M redundant storage devices where M is greater than N and none of the linear expressions is linearly dependent upon any group of N−1 of the M linear expression.

11 Claims, 10 Drawing Sheets

Galois Addition And Subtraction Table For 4-Bit Values

```
  Addends
 Minuends ──►  1   2   3   4   5   6   7   8   9  10  11  12  13  14  15
Subtrahends
          1   0   3   2   5   4   7   6   9   8  11  10  13  12  15  14
          2   3   0   1   6   7   4   5  10  11   8   9  14  15  12  13
          3   2   1   0   7   6   5   4  11  10   9   8  15  14  13  12
          4   5   6   7   0   1   2   3  12  13  14  15   8   9  10  11
          5   4   7   6   1   0   3   2  13  12  15  14   9   8  11  10
          6   7   4   5   2   3   0   1  14  15  12  13  10  11   8   9
          7   6   5   4   3   2   1   0  15  14  13  12  11  10   9   8
          8   9  10  11  12  13  14  15   0   1   2   3   4   5   6   7
          9   8  11  10  13  12  15  14   1   0   3   2   5   4   7   6
         10  11   8   9  14  15  12  13   2   3   0   1   6   7   4   5
         11  10   9   8  15  14  13  12   3   2   1   0   7   6   5   4
         12  13  14  15   8   9  10  11   4   5   6   7   0   1   2   3
         13  12  15  14   9   8  11  10   5   4   7   6   1   0   3   2
         14  15  12  13  10  11   8   9   6   7   4   5   2   3   0   1
         15  14  13  12  11  10   9   8   7   6   5   4   3   2   1   0
          ▲                      Sums
          │                   Differences
      Addends
     Minuends
   Subtrahends
```

FIG. 6

Galois Multiplication Table For 4-Bit Values

Multiplicands →

| Multipliers | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 2 | 4 | 6 | 8 | 10 | 12 | 14 | 15 | 13 | 11 | 9 | 7 | 5 | 3 | 1 |
| 3 | 6 | 5 | 12 | 15 | 10 | 9 | 7 | 4 | 1 | 2 | 11 | 8 | 13 | 14 |
| 4 | 8 | 12 | 15 | 11 | 7 | 3 | 1 | 5 | 9 | 13 | 14 | 10 | 6 | 2 |
| 5 | 10 | 15 | 11 | 14 | 1 | 4 | 9 | 12 | 3 | 6 | 2 | 7 | 8 | 13 |
| 6 | 12 | 10 | 7 | 1 | 11 | 13 | 14 | 8 | 2 | 4 | 9 | 15 | 5 | 3 |
| 7 | 14 | 9 | 3 | 4 | 13 | 10 | 6 | 1 | 8 | 15 | 5 | 2 | 11 | 12 |
| 8 | 15 | 7 | 1 | 9 | 14 | 6 | 2 | 10 | 13 | 5 | 3 | 11 | 12 | 4 |
| 9 | 13 | 4 | 5 | 12 | 8 | 1 | 10 | 3 | 7 | 14 | 15 | 6 | 2 | 11 |
| 10 | 11 | 1 | 9 | 3 | 2 | 8 | 13 | 7 | 6 | 12 | 4 | 14 | 15 | 5 |
| 11 | 9 | 2 | 13 | 6 | 4 | 15 | 5 | 14 | 12 | 7 | 8 | 3 | 1 | 10 |
| 12 | 7 | 11 | 14 | 2 | 9 | 5 | 3 | 15 | 4 | 8 | 13 | 1 | 10 | 6 |
| 13 | 5 | 8 | 10 | 7 | 15 | 2 | 11 | 6 | 14 | 3 | 1 | 12 | 4 | 9 |
| 14 | 3 | 13 | 6 | 8 | 5 | 11 | 12 | 2 | 15 | 1 | 10 | 4 | 9 | 7 |
| 15 | 1 | 14 | 2 | 13 | 3 | 12 | 4 | 11 | 5 | 10 | 6 | 9 | 7 | 8 |

↑ Multipliers / Multiplicands — Products

FIG. 7

Galois Division Table For 4-Bit Values

| Divisors → | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 15 | 10 | 8 | 6 | 5 | 9 | 4 | 7 | 3 | 14 | 13 | 12 | 11 | 2 |
| 2 | 2 | 1 | 11 | 15 | 12 | 10 | 13 | 8 | 14 | 6 | 3 | 5 | 7 | 9 | 4 |
| 3 | 3 | 14 | 1 | 7 | 10 | 15 | 4 | 12 | 9 | 5 | 13 | 8 | 11 | 2 | 6 |
| 4 | 4 | 2 | 9 | 1 | 7 | 11 | 5 | 15 | 3 | 12 | 6 | 10 | 14 | 13 | 8 |
| 5 | 5 | 13 | 3 | 9 | 1 | 14 | 12 | 11 | 4 | 15 | 8 | 7 | 2 | 6 | 10 |
| 6 | 6 | 3 | 2 | 14 | 11 | 1 | 8 | 7 | 13 | 10 | 5 | 15 | 9 | 4 | 12 |
| 7 | 7 | 12 | 8 | 6 | 13 | 4 | 1 | 3 | 10 | 9 | 11 | 2 | 5 | 15 | 14 |
| 8 | 8 | 4 | 13 | 2 | 14 | 9 | 10 | 1 | 6 | 7 | 12 | 11 | 3 | 5 | 15 |
| 9 | 9 | 11 | 7 | 10 | 8 | 12 | 3 | 5 | 1 | 4 | 2 | 6 | 15 | 14 | 13 |
| 10 | 10 | 5 | 6 | 13 | 2 | 3 | 7 | 9 | 8 | 1 | 15 | 14 | 4 | 12 | 11 |
| 11 | 11 | 10 | 12 | 5 | 4 | 6 | 14 | 13 | 15 | 2 | 1 | 3 | 8 | 7 | 9 |
| 12 | 12 | 6 | 4 | 3 | 9 | 2 | 15 | 14 | 5 | 11 | 10 | 1 | 13 | 8 | 7 |
| 13 | 13 | 9 | 14 | 11 | 15 | 7 | 6 | 10 | 2 | 8 | 4 | 12 | 1 | 3 | 5 |
| 14 | 14 | 7 | 15 | 12 | 5 | 8 | 2 | 6 | 11 | 13 | 9 | 4 | 10 | 1 | 3 |
| 15 | 15 | 8 | 5 | 4 | 3 | 13 | 11 | 2 | 12 | 14 | 7 | 9 | 6 | 10 | 1 |

↑ Dividends — Quotients

FIG. 8

Encoding Table

| A | B | A+B | A+2B | A+3B | 2A+B | 3A+B |
|---|---|-----|------|------|------|------|
| 0 | 0 | 0 | 0 | 0 | 0 | 0 |
| 0 | 1 | 1 | 2 | 3 | 1 | 1 |
| 0 | 2 | 2 | 4 | 6 | 2 | 2 |
| ... | ... | ... | ... | ... | ... | ... |
| 0 | 13 | 14 | 3 | 13 | 14 | 14 |
| 0 | 15 | 15 | 1 | 14 | 15 | 15 |
| 1 | 0 | 1 | 1 | 1 | 2 | 3 |
| ... | ... | ... | ... | ... | ... | ... |
| 1 | 15 | 14 | 0 | 15 | 13 | 12 |
| 2 | 0 | 2 | 2 | 2 | 4 | 6 |
| ... | ... | ... | ... | ... | ... | ... |
| 2 | 15 | 13 | 3 | 12 | 11 | 9 |
| 3 | 0 | 3 | 3 | 3 | 6 | 5 |
| ... | ... | ... | ... | ... | ... | ... |
| 3 | 15 | 12 | 2 | 13 | 9 | 10 |
| ... | ... | ... | ... | ... | ... | ... |
| ... | ... | ... | ... | ... | ... | ... |
| ... | ... | ... | ... | ... | ... | ... |
| 14 | 0 | 14 | 14 | 14 | 3 | 13 |
| ... | ... | ... | ... | ... | ... | ... |
| 14 | 15 | 1 | 15 | 0 | 12 | 2 |
| 15 | 0 | 15 | 15 | 15 | 1 | 14 |
| 15 | 1 | 14 | 13 | 12 | 0 | 15 |
| 15 | 2 | 13 | 11 | 9 | 3 | 12 |
| ... | ... | ... | ... | ... | ... | ... |
| 15 | 13 | 2 | 10 | 7 | 12 | 3 |
| 15 | 14 | 1 | 12 | 2 | 15 | 0 |
| 15 | 15 | 0 | 14 | 1 | 14 | 1 |

FIG. 9

Decoding Table

| 2A+B | A+2B | A | B |
|------|------|-----|-----|
| 0 | 0 | 0 | 0 |
| 0 | 1 | 6 | 12 |
| 0 | 2 | 12 | 7 |
| ... | ... | ... | ... |
| 0 | 13 | 15 | 1 |
| 0 | 14 | 5 | 10 |
| 0 | 15 | 3 | 6 |
| 1 | 0 | 12 | 6 |
| ... | ... | ... | ... |
| 1 | 15 | 15 | 0 |
| 2 | 0 | 7 | 12 |
| ... | ... | ... | ... |
| 2 | 15 | 4 | 10 |
| 3 | 1 | 13 | 6 |
| ... | ... | ... | ... |
| 3 | 15 | 8 | 12 |
| ... | ... | ... | ... |
| ... | ... | ... | ... |
| ... | ... | ... | ... |
| 14 | 0 | 10 | 5 |
| ... | ... | ... | ... |
| 14 | 15 | 9 | 3 |
| 15 | 0 | 6 | 3 |
| 15 | 1 | 0 | 15 |
| 15 | 2 | 10 | 4 |
| ... | ... | ... | ... |
| 15 | 13 | 9 | 2 |
| 15 | 14 | 3 | 9 |
| 15 | 15 | 5 | 5 |

Encoded Values (2A+B, A+2B)

FIG. 10

REDUNDANT STORAGE OF COMPUTER DATA

CROSS-REFERENCE TO RELATED APPLICATION

This application is a continuation application of and claims priority from U.S. patent application Ser. No. 11/136,660, filed on May 24, 2005.

BACKGROUND OF THE INVENTION

1. Field of the Invention

The field of the invention is data processing, or, more specifically, methods, systems, and products for redundant storage of computer data.

2. Description of Related Art

Retrieving computer data from tape backup is an expensive process, often requiring human intervention. It is more efficient to retrieve computer data from a storage device available across a local network or a local data communication connection. A corporate desktop computer today may be provided with 80 or more gigabytes of hard disk space, much of which may be unused. On a local area network with a few dozen such machines there may be huge amounts of unused storage space from which data could be retrieved much more efficiently than from a tape drive, for example. In prior art, however, there is no efficient way to access such storage. Moreover, the storage space involved is unreliable. Individual users on desktop computers may reinstall an operating system without notice, install and remove disks, reformat a disk, and, of course, simply turn off the computer.

SUMMARY OF THE INVENTION

Methods, systems, and products are disclosed for storage of computer data on unreliable media where the risk of unreliability is reduced with redundancy. More particularly, methods, systems, and products are disclosed for redundant storage of computer data that include encoding N data values through M linear expressions into M encoded data values and storing each encoded data value separately on one of M redundant storage devices where M is greater than N and none of the linear expressions is linearly dependent upon any group of N=1 of the M linear expressions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 6 sets forth a table illustrating Galois addition and Galois for values that fit into 4 bits of binary storage.

FIG. 7 sets forth a table illustrating Galois multiplication function for 4-bit values.

FIG. 8 sets forth a table illustrating Galois division for values that can be represented with 4 binary bits.

FIG. 9 sets forth an example of an encoding table for the case of N=2, M=7, for the 7 linear expressions A, B, A+B, A+2B, A+3B, 2A+B, 3A+B, where the calculation of the values in the table is carried out in 4-bit Galois math.

FIG. 10 sets forth an example of a decoding table for the case of N=2 for decoding values encoded with the 2 linear expressions 2A+B and A+2B where the calculation of the values in the table is carried out in 4-bit Galois math.

DETAILED DESCRIPTION OF EXEMPLARY EMBODIMENTS

Figure 1:
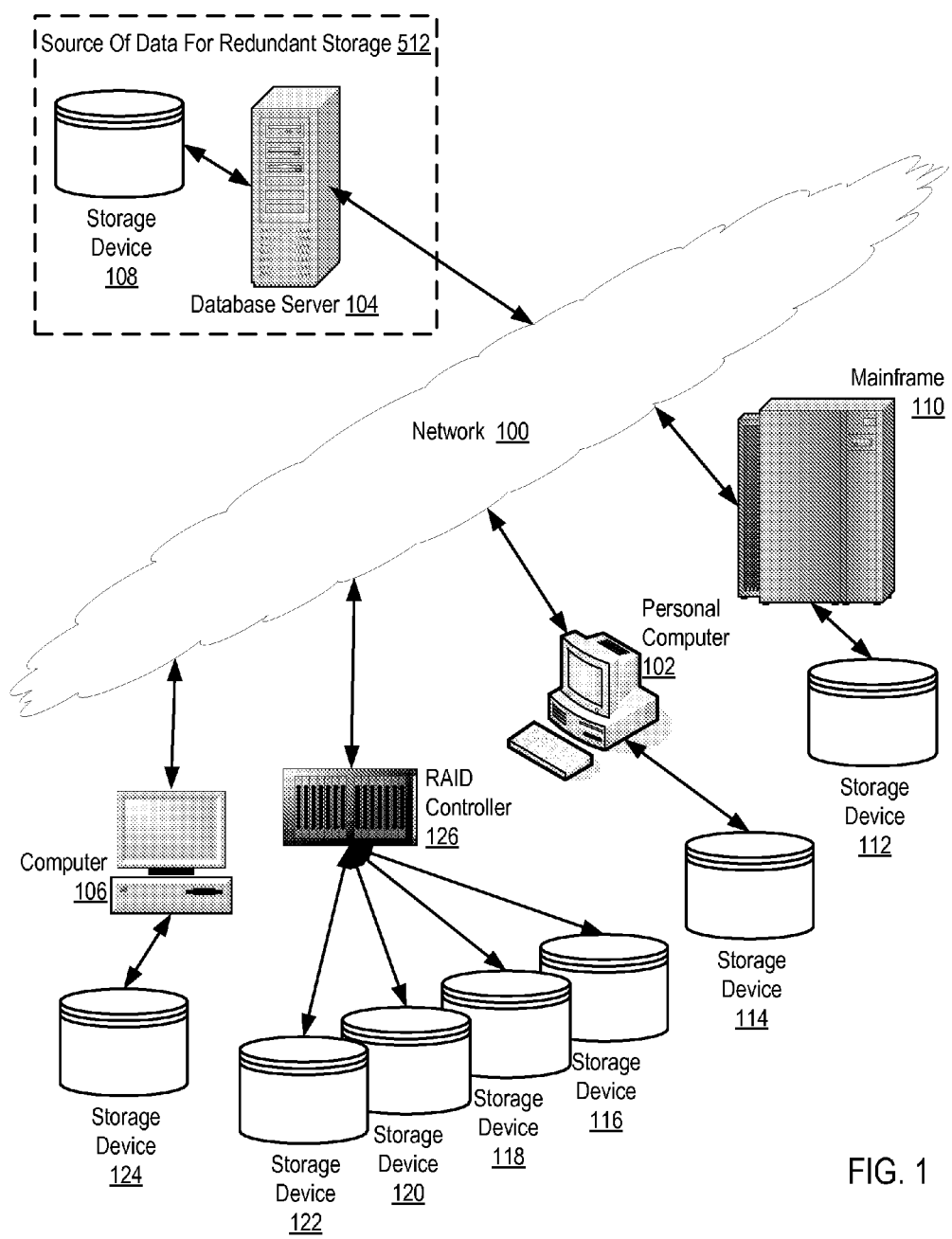
FIG. 1 sets forth a network diagram illustrating an exemplary system for redundant storage of computer data according to embodiments of the present invention.

Exemplary methods, systems, and products for redundant storage of computer data according to embodiments of the present invention are described with reference to the accompanying drawings, beginning with FIG. 1. FIG. 1 sets forth a network diagram illustrating an exemplary system for redundant storage of computer data according to embodiments of the present invention. As explained in more detail below, the system of FIG. 1 operates generally to carry out redundant storage of computer data according to embodiments of the present invention by encoding N data values through M linear expressions into M encoded data values, storing each encoded data value separately on one of M redundant storage devices, where M is greater than N and none of the linear expressions is linearly dependent upon any group of N−1 of the M linear expressions.

Data for redundant storage is any computer data that may usefully be stored, for backup purposes, for example, on unreliable media. Unreliable media are any storage media from which stored data is not guaranteed to be completely recoverable. Encoding N data values through M linear expressions into M encoded data values, one data value for each linear expression, when repeated for many data values, may be viewed as producing M streams of encoded data for storage on M redundant storage devices. Each of the N data values can be recovered from storage, so long as at least N of the encoded values can be recovered. In an example where N=2 and M=7, the encoded data is stored on 7 redundant storage devices, and all the data is recoverable if the encoded data is recoverable from only two of the redundant storage devices. The other 5 redundant storage device may be off-line, damaged, or even destroyed. The data is still recoverable if two of them are available. That is how the risk of using unreliable media is reduced with redundancy.

The system of FIG. 1 includes a source of data for redundant storage (512) represented as a database server (104) that implements persistent data storage with storage device (108). Database server (104) is coupled for data communications to other computers through network (100). Also coupled to network (100) for data communications are several other computers including desktop computer (106), RAID (Redundant Array of Independent Disks) controller (126), personal computer (102), and mainframe computer (110). The system of FIG. 1 also includes redundant storage devices (112-124). The redundant storage devices are not redundant as devices. The redundant storage devices are 'redundant storage devices' in the sense that portions of their storage media are made available for redundant storage of data from source (512) through improvements according to embodiments of the present invention in desktop computer (106), RAID controller (126), personal computer (102), and mainframe computer (110).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Figure 2:
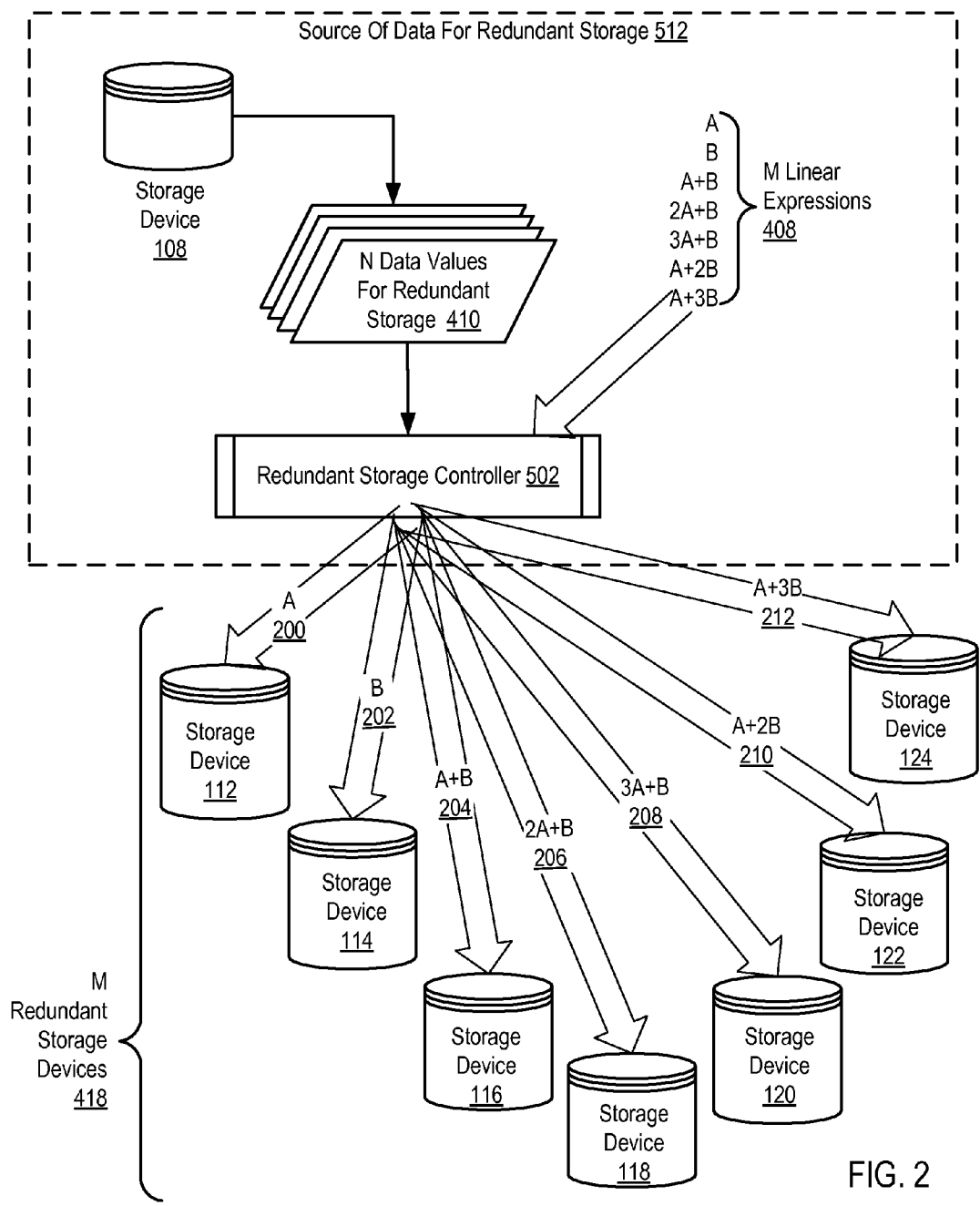
FIG. 2 sets forth a block diagram illustrating an exemplary system for redundant storage of computer data according to embodiments of the present invention.

For further explanation, FIG. 2 sets forth a block diagram illustrating an exemplary system for redundant storage of computer data according to embodiments of the present invention. The system of FIG. 2 includes a redundant storage controller (502), a software module programmed to carry out redundant storage of computer data according to embodiments of the present invention. Redundant storage controller (502) operates generally to carry out redundant storage of computer data according to embodiments of the present invention by encoding N data values through M linear expressions into M encoded data values, storing each encoded data value separately on one of M redundant storage devices, where M is greater than N and none of the linear expressions is linearly dependent upon any group of N−1 of the M linear expressions. A linear expression is an expression of the form $xa+yb+z$ where $a$ and $b$ are variables and $x$, $y$, and $z$ are constants. In the example of FIG. 2, M is set to 7, and N is set to 2. With M=7 and N=2, data values for redundant storage (410) from storage device (108) are encoded in this example using the 7 linear expressions (408) A, B, A+B, 2A+B, 3A+B, A+2B, and A+3B, each of which is formed with two variables, A and B. (The linear expression A is formed from A and B with B multiplied by zero; the linear expression B is formed from A and B with A multiplied by zero.)

Redundant storage controller (502), by encoding a stream of N data values from storage device (108) through M linear expressions into M encoded data values and storing each encoded data value separately on one of M redundant storage devices produces, in this example because M=7, 7 streams of encoded data, one for each of the 7 linear expressions. The redundant storage controller directs each stream of encoded data to a separate redundant storage device. That is:

the stream of data encoded through linear expression A is stored through stream (200) on storage device (112);
the stream of data encoded through linear expression B is stored through stream (202) on storage device (114);
the stream of data encoded through linear expression A+B is stored through stream (204) on storage device (116);
the stream of data encoded through linear expression 2A+B is stored through stream (206) on storage device (118);
the stream of data encoded through linear expression 3A+B is stored through stream (208) on storage device (120);
the stream of data encoded through linear expression A+2B is stored through stream (210) on storage device (122); and
the stream of data encoded through linear expression A+3B is stored through stream (212) on storage device (124).

Redundant storage controller (502) encodes the data values (410) through M linear expressions (408) into M encoded data values by calculating values for the expressions. Given data values A=5 and B=6 with N=2 and M=7, for example, redundant storage controller (502) encodes the data values by calculating values for each of the 7 expressions:

$A=5$ $B=6$ $A+B=11$ $2A+B=16$ $3A+B=21$ $A+2B=17$ $A+3B=23$

In this example, redundant storage controller (502) stores the encoded value for A on storage device (112), the encoded value for B on storage device (114), the encoded value for A+B on storage device (116), and so on, storing each encoded data value separately on one of M redundant storage devices (418). Then redundant storage controller (502) repeats the encoding process for the next N data values in the stream of data for redundant storage from storage device (108), and then repeats again for the next N data values, and again, and again, creating M streams of encoded values for redundant storage on M redundant storage devices according to M linear expressions.

All the data is recoverable so long as at least N of the redundant storage devices remain operable. In the example, of FIG. 2, if storage devices (112, 114, 116, 118, and 120) are all unavailable, off-line, damaged, for any reason, and only storage devices (122) and (124) remain to support recovery of redundant data storage, all the data can be recovered. Recovering the encoded data from storage devices (122) and (124) in this example recovers the data encoded as A+2B and A+3B. Continuing with the example of two data values A=5 and B=6, both can be recovered by linear algebra. Recover B by subtracting the two expressions:

$A+3B=23$ $A+2B=17$ to obtain B=6, and then substitute B=6 into A+2B=17 as A+2(6)=17 to obtain A=17−12=5. Encoded data from any 2 of the 7 storage devices in the particular example of FIG. 7 can be recovered by linear algebra, and in the general case, encoded data from any N of M storage devices in the particular can be recovered by application of linear algebra—so long as N is less than M and, as explained in more detail below, none of the linear expressions used for encoding is linearly dependent upon any group of N−1 of the M linear expressions.

Redundant storage of computer data in accordance with embodiments of the present invention is generally implemented with computers, that is, with automated computing machinery. In the system of FIG. 1, for example, all the nodes, the database server, the storage devices, the RAID controller, and so on, are implemented to some extent at least as computers. For further explanation, therefore, FIG. 3 sets forth a block diagram of automated computing machinery comprising an exemplary computer (152) useful in redundant storage of computer data according to embodiments of the present invention. The computer (152) of FIG. 3 includes at least one computer processor (156) or 'CPU' as well as random access memory (168) ('RAM') which is connected through a system bus (160) to processor (156) and to other components of the computer.

Stored in RAM (168) is a database management system ('DBMS') (186) of a kind that may serve as a source of data for redundant storage by operating a database through a database server such as the one illustrated at reference (104) on FIG. 1. Also stored in RAM are data values for redundant storage (410). Also stored in RAM is a redundant storage controller, a set of computer program instructions that implement redundant storage of computer data according to embodiments of the present invention by encoding data values through linear expressions and storing the encoded data values on redundant storage devices according to embodiments of the present invention. Also stored in RAM (168) is a redundant storage daemon, a set of computer program instructions that implement redundant storage of computer data according to embodiments of the present invention by monitoring and indicating the unused portion of storage space on a redundant storage device, writing encoded data to an unused portion of storage space on a redundant storage device, and reducing encoded storage on the redundant storage device when free storage space is less than a predetermined threshold amount.

Also stored in RAM (168) is an operating system (154). Operating systems useful in computers according to embodiments of the present invention include UNIX™, Linux™, Microsoft NT™, AIX™, IBM's i5/OS™, and others as will occur to those of skill in the art. Operating system (154), DBMS (186), data values for redundant storage (410), redundant storage controller (502), and redundant storage daemon (504) in the example of FIG. 3 are shown in RAM (168), but many components of such software typically are stored in non-volatile memory (166) also.

Figure 3:
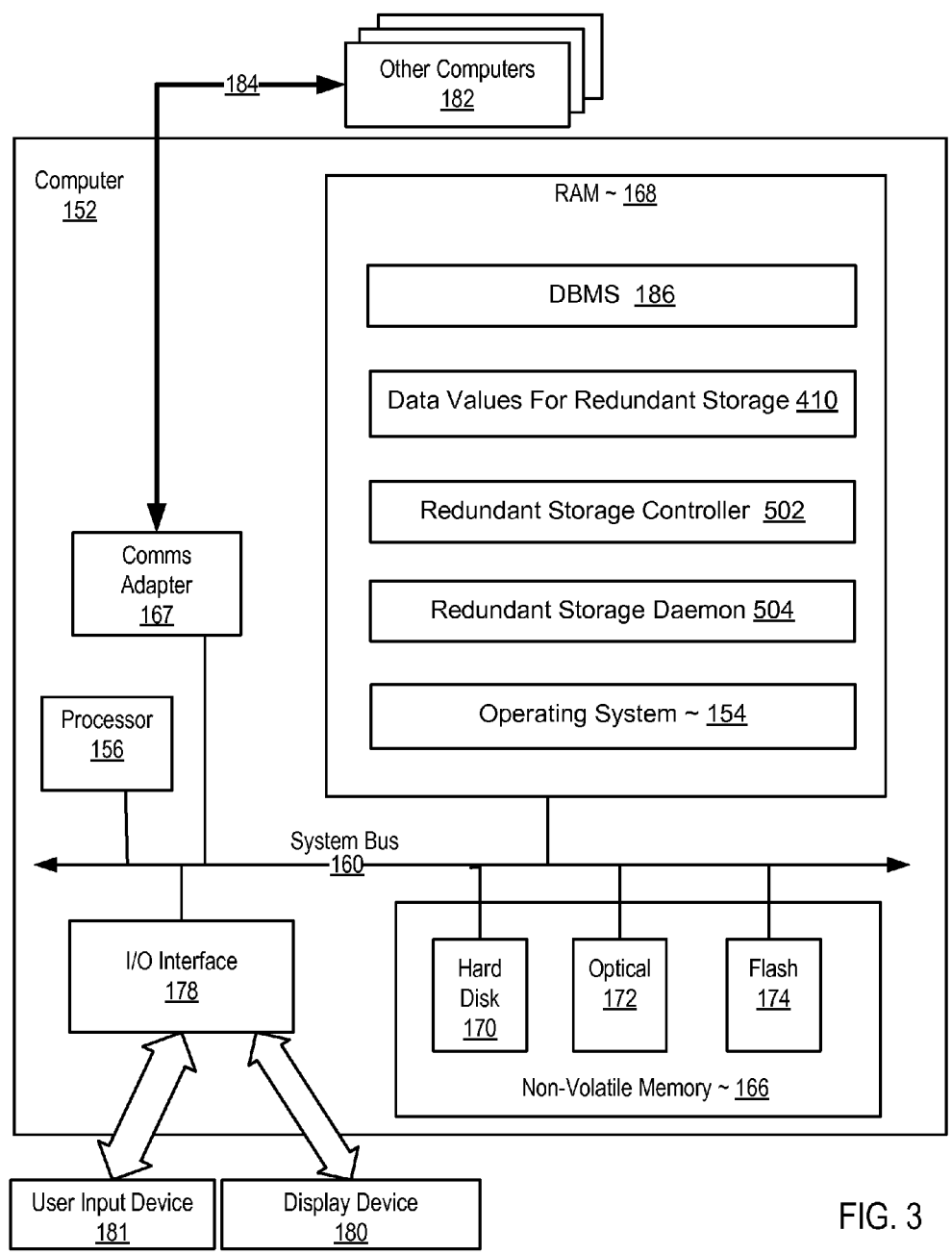
FIG. 3 sets forth a block diagram of automated computing machinery comprising an exemplary computer useful in redundant storage of computer data according to embodiments of the present invention.

Computer (152) of FIG. 3 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 3 includes a communications adapter (167) for implementing data communications (184) with other computers (182), including, for example, redundant storage devices. Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 4:
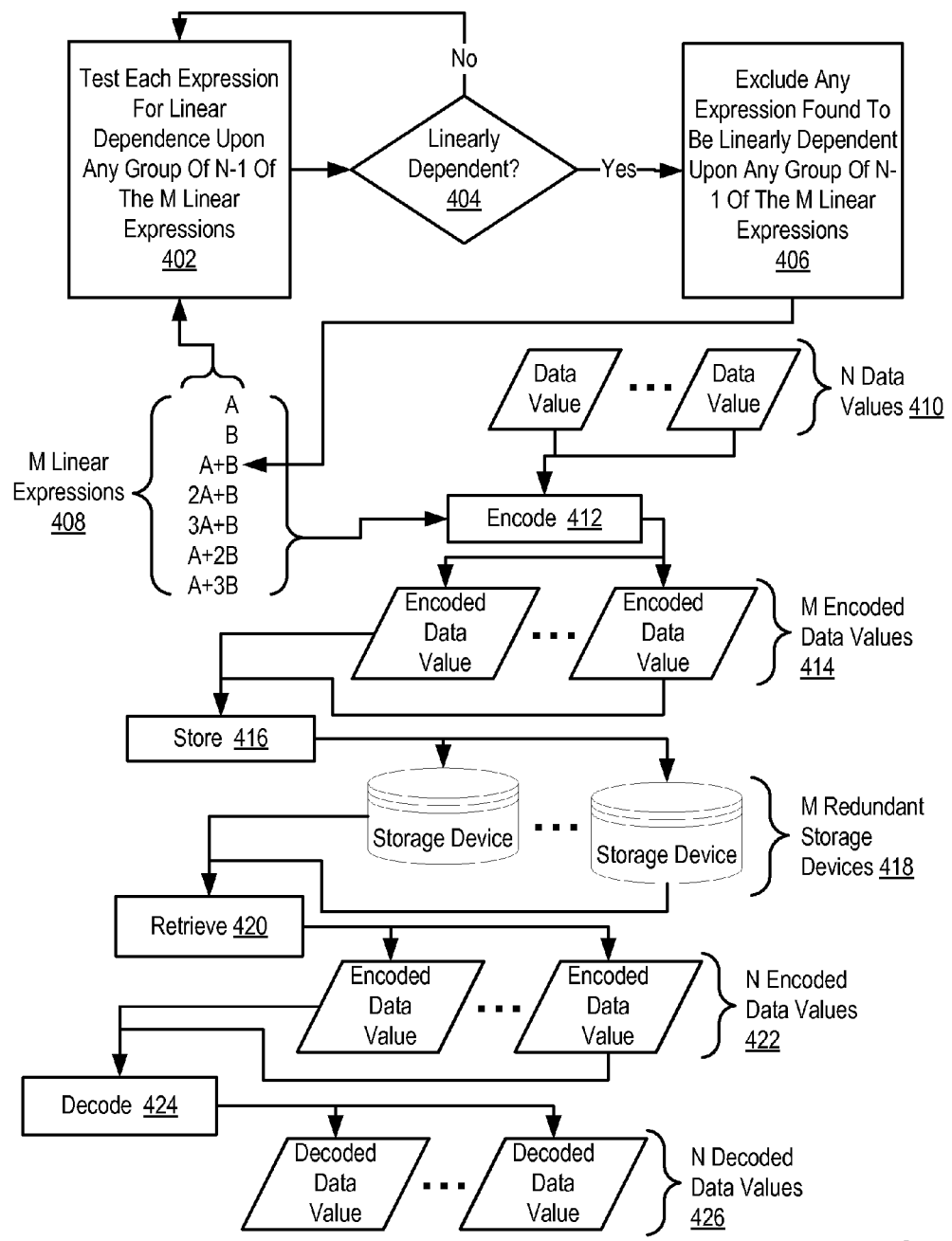
FIG. 4 sets forth a flow chart illustrating an exemplary method for redundant storage of computer data according to embodiments of the present invention.

For further explanation, FIG. 4 sets forth a flow chart illustrating an exemplary method for redundant storage of computer data according to embodiments of the present invention that includes encoding (412) N data values (410) through M linear expressions (408) into M encoded data values (414) and storing (416) each encoded data value separately on one of M redundant storage devices (418). In the method of FIG. 4, M is greater than N, and none of the linear expressions is linearly dependent upon any group of N-1 of the M linear expressions.

Encoding with standard arithmetic results in values for linear expressions that vary in their storage requirements. Recall from the example above that data values A=5 and B=6 with N=2 and M=7 may be encoded with the 7 linear expressions A, B, A+B, 2A+B, 3A+B, A+2B, and A+3B as:

$A=5$ $B=6$ $A+B=11$ $2A+B=16$ $3A+B=21$ $A+2B=17$ $A+3B=23$

Readers will observe that the value of the expression A=5 can be stored in four binary bits as 0101, and the value of the expression B=6 can be stored in four binary bits as 0110. The binary value of A+B=11 fits in four bits: 1011. The binary value of the expression 2A+B=16, however, requires more than four bits of storage: 10000. It is more difficult to synchronize streams of recovery data from redundant storage devices if the encoded values are of various sizes.

In the method of FIG. 4, encoding (412) N data values (410) through M linear expressions (408) into M encoded data values (414) may be carried out by calculating values for the expressions with Galois arithmetic. Galois arithmetic is an arithmetic whose values always fit into the same quantity of binary storage. The quantity of storage may be varied according to the application, 4 bits, 8 bits, 24 bits, and so on, as will occur to those of skill in the art. That is, in the method of FIG. 4, encoding (412) data values (410) may be carried out by encoding data values in units of four bits per value, the advantages of which are clarified in the description set forth below in this specification.

Galois addition is defined as a Boolean exclusive-OR operation, 'XOR.' Galois subtraction also is defined as a Boolean exclusive-OR operation, 'XOR.' That is, Galois addition and Galois subtraction are the same operation. In Galois math, A+B=B+A=A−B=B−A. XORing values expressed in the same number of binary bits always yields a value that can be expressed in the same number of binary bits. Examples include:

| | 0001 | | 0001 | | 1010 |
|---|---|---|---|---|---|
| XOR | 0001 | XOR | 0010 | XOR | 0101 |
| | 0000 | | 0011 | | 1111 |

There are only 16 possible values that can be expressed in 4 binary bits, 0-15. The table in FIG. 6 therefore sets forth the entire Galois addition function and the entire Galois subtraction function for values that fit into 4 bits of binary storage. In the table of FIG. 6, values in the top row represent addends, minuends, or subtrahends, and values in the leftmost column also represent addends, minuends, or subtrahends. Sums and differences are represented in the other rows and columns. Each sum of two addends is at the intersection of a row and column identified by the addends. Each difference of a minuend and subtrahend is at the intersection of a row and column identified by the minuend and subtrahend. From the table of FIG. 6, therefore, in Galois addition: 6+4=2, 2+10=8, 7+13=10, 11+7=12, 15+14=1, and so on. From the table of FIG. 6, in Galois subtraction: 6−4=2, 4−6=2, 7−12=11, 4−10=14, 14−3=13, and so on.

Just as the table in FIG. 6 sets forth the entire Galois addition function for all 4-bit values, so the table in FIG. 7 sets forth the entire Galois multiplication function for all 4-bit values. The values in the topmost row of the table in FIG. 6 and the values in the leftmost column are multipliers or multiplicands. The values in the other rows and columns are products. Each product of a multiplicand and a multiplier is at the intersection of a row and column identified by the multiplicand and a multiplier. From the table of FIG. 6, therefore, in Galois multiplication: 6×4=7, 2×10=11, 7×13=2, 11×7=15, 15×14=7, and so on.

The multiplication table of FIG. 7 is created by use of multiplication with a 'generator.' A generator is a quantity chosen so that multiplication is reversible. That is, when doing Galois multiplication on values of k bits, the generator is a 1+k bit number (a number equal to or larger than $2^k$ and smaller than $2^{k+1}$ chosen so that multiplication is reversible. Reversible multiplication is multiplication so that if ab=ac then either a=0 or b=c. The table of FIG. 7 was created with a generator of value 31.

According to the table of FIG. 7, decimal 10×10=7. The following demonstrates how to multiply 10×10 in Galois arithmetic and therefore how to create the table of FIG. 7. First, express the values to be multiplied in binary, then multiply, using XOR instead of addition:

$$\begin{array}{r} 1010 \\ \times \underline{1010} \\ 1010000 \\ xor \underline{10100} \\ 1000100 \end{array}$$

The result is a 7-bit value, which is reduced to a 4-bit value by XORing the result with the value of the generator multiplied by $2^k$, where k is the appropriate value to zero out the multiplication result:

$$\begin{array}{r} 1000100 \\ xor \underline{1111100} = \text{generator} \times 2^2 \\ 0111000 \end{array}$$

This result, 111100, is a 6-bit value, still not a 4-bit value. The size of the value is again reduced, this time by XORing the result with the value of the generator multiplied by $2^1$:

$$\begin{array}{r} 0111000 \\ xor \underline{111110} = \text{generator} \times 2^1 \\ 000110 \end{array}$$

Which is six, a value that fits into 4-bits. In Galois arithmetic, therefore, 10×10=6. All the other products in the table of FIG. 7 are created by the same use of the generator, 2×2=4 ... 2×15=1, 3×2=6 ... 3×15=14, and so on. Readers will recognize in view of this explanation, that Galois multiplication by use of a table makes more efficient use of computer resources because calculating a product of a multiplier and a multiplicand in Galois arithmetic typically will take much longer than a table lookup.

Galois division is a true inverse of Galois multiplication. It is therefore possible to use the multiplication table of FIG. 7 for division. For convenience of reference, however, the Galois division table of FIG. 8 is created by rearranging the values in the table of FIG. 7 so that values for dividends and divisors are located in the leftmost column and the top row respectively. The values in the other rows and columns are quotients. Each quotient of a dividend divided by a divisor is at the intersection of a row and column identified by the dividend and the divisor. The table in FIG. 8 sets forth the entire Galois division function for all values that can be represented with 4 binary bits. From the table of FIG. 8, therefore, in Galois division: 6÷4=14, 2÷10=6, 7÷13=5, 11÷7=14, 15÷14=10, and so on.

Because calculations can be performed in Galois arithmetic with values that never exceed 4 binary bits in size, efficient lookup tables may be constructed. Each of the addition, multiplication, and division tables in FIGS. 6, 7, and 8 contains only about 256 values each of which is expressed in only 4 bits—so that a complete Galois math may be expressed in less than half a kilobyte. In addition to the arithmetic tables, efficient tables for encoding and decoding through linear expressions also may be constructed.

FIG. 9 sets forth an example of an encoding table for the case of N=2, M=7, for the 7 linear expressions A, B, A+B, A+2B, A+3B, 2A+B, 3A+B, where the calculation of the values in the table is carried out in 4-bit Galois math. Because there are only 256 possible combinations of the N=2 data values of 0-15, such a table requires only 256 rows—and 1 column for each of the M=7 linear expressions used for encoding. In the case of N=2, M=7, such a table requires 256×7=1792 entries each of which occupies only 4 bits of storage so that the entire encoding table fits into less than 1 kilobyte of memory. Encoding is carried out with such a table by looking up a value for an expression according to the N (=2, in this example) data values to be encoded. In this example:
the encoded value for the data values A=3 and B=15 encoded through A+2B is 2,
the encoded value for the data values A=0 and B=2 encoded through A+3B is 6,
the encoded value for the data values A=14 and B=15 encoded through 2A+B is 12,
the encoded value for the data values A=15 and B=2 encoded through A+B is 13,
the encoded value for the data values A=15 and B=14 encoded through 3A+B is 1,
and so on.

FIG. 10 sets forth an example of a decoding table for the case of N=2 for decoding values encoded with the 2 linear expressions 2A+B and A+2B where the calculation of the values in the table is carried out in 4-bit Galois math. Because there are only 256 possible combinations of the N=2 data values of 0-15, such a table requires only 256 rows, 1 column for each linear expression used to decode, and 1 column for each of the N=2 data values to be retrieved through decoding. All values in the table occupy only 4 bits of memory, so the size of such a table in bytes is only 512 bytes. In order to provide a set of such tables for decoding any combination of N encoded values encoded with any of M linear expressions, M!/N!(M−N)! tables are needed. In the case of N=2, M=7, $$\frac{M!}{N!(M-N)!} = \frac{7!}{2!(5!)} = \frac{7(6)}{2} = 21$$

At 512 bytes per table, therefore, all the decoding for the case of N=2, M=7, can be done with tables occupying less than 11 kilobytes of memory.

Decoding is carried out with such a table by a lookup on encoded values. In the table of FIG. 10, the encoded values are in the columns labeled 2A+B and A+2B. Decoding with the table in FIG. 10 yields, for example:

the data values decoded from the encoded values 2A+B=0 and A+2B=1 are A=6 and B=12,
the data values decoded from the encoded values 2A+B=0 and A+2B=14 are A=5 and B=10,
the data values decoded from the encoded values 2A+B=3 and A+2B=15 are A=8 and B=12,
the data values decoded from the encoded values 2A+B=14 and A+2B=15 are A=9 and B=3,
the data values decoded from the encoded values 2A+B=15 and A+2B=14 are A=3 and B=9,
and so on.

Again with reference to FIG. 4: The method of FIG. 4 also includes retrieving (420) encoded data values (422) from storage in redundant storage devices (418) and decoding (424) the encoded data values (422), thereby producing N decoded data values (426) that are the same N data values (410) that were earlier encoded and stored on M redundant storage devices. As explained above, encoded values need be retrieved from only N of the M redundant storage devices for all of the original data values to be recovered. The encoded data may be decoded by techniques of linear algebra as explained above or by table lookups on tables generated as described above.

As mentioned above, in the method of FIG. 4, none of the linear expressions is linearly dependent upon any group of N−1 of the M linear expressions. The method of FIG. 4 therefore also includes testing (402) each of the M linear expressions (408) for linear dependence (404) upon each group of N−1 of the M linear expressions and excluding (406) from the M linear expressions any expression found to be linearly dependent upon any group of N−1 of the M linear expressions. In the method of FIG. 4, one of the M linear expressions e* is linearly dependent upon a group of N−1 of the M linear expressions if:

$$e^* = \sum_{i=1}^{n-1} a_i e_i,$$

where $a_i$ is any linear coefficient, $e_i$ is one of the M linear expressions, and N is the number of data values to be encoded. A practical way to test for linear dependence therefore is to generate a table like the one illustrated in FIG. 9 containing all the values for all M linear expressions calculated for all values of the N data values to be encoded and scan the table to determine whether, for two different sets of N values, there is a subset of N linear expressions (out of the M linear expressions in total) which results in the same values. If such a subset exists, one of the expressions in the subset is excluded from the M linear expressions. An additional linear expression may be substituted to bring the number of linear expressions back up to M.

For further explanation, here is an example of linear dependence for the case of N=3:

| A | B | C | A+B+C | A+2B+2C |
|---|---|---|-------|---------|
| 0 | 1 | 0 | 1     | 2       |
| 0 | 0 | 1 | 1     | 2       |

The subset (A, A+B+C, A+2B+2C) encodes both of the lines above (0, 1, 0) and (o, 0, 1) into the same values: (0, 1, 2). In other words, taking $e_1$=A, $e_2$=A+B+C, and e*=A+2B+2C, then e*=$e_1$+2$E_2$. The subset (A, A+B+C, A+2B+2C) therefore is linearly dependent, and one of the expressions in the subset needs to be removed.

Figure 5:
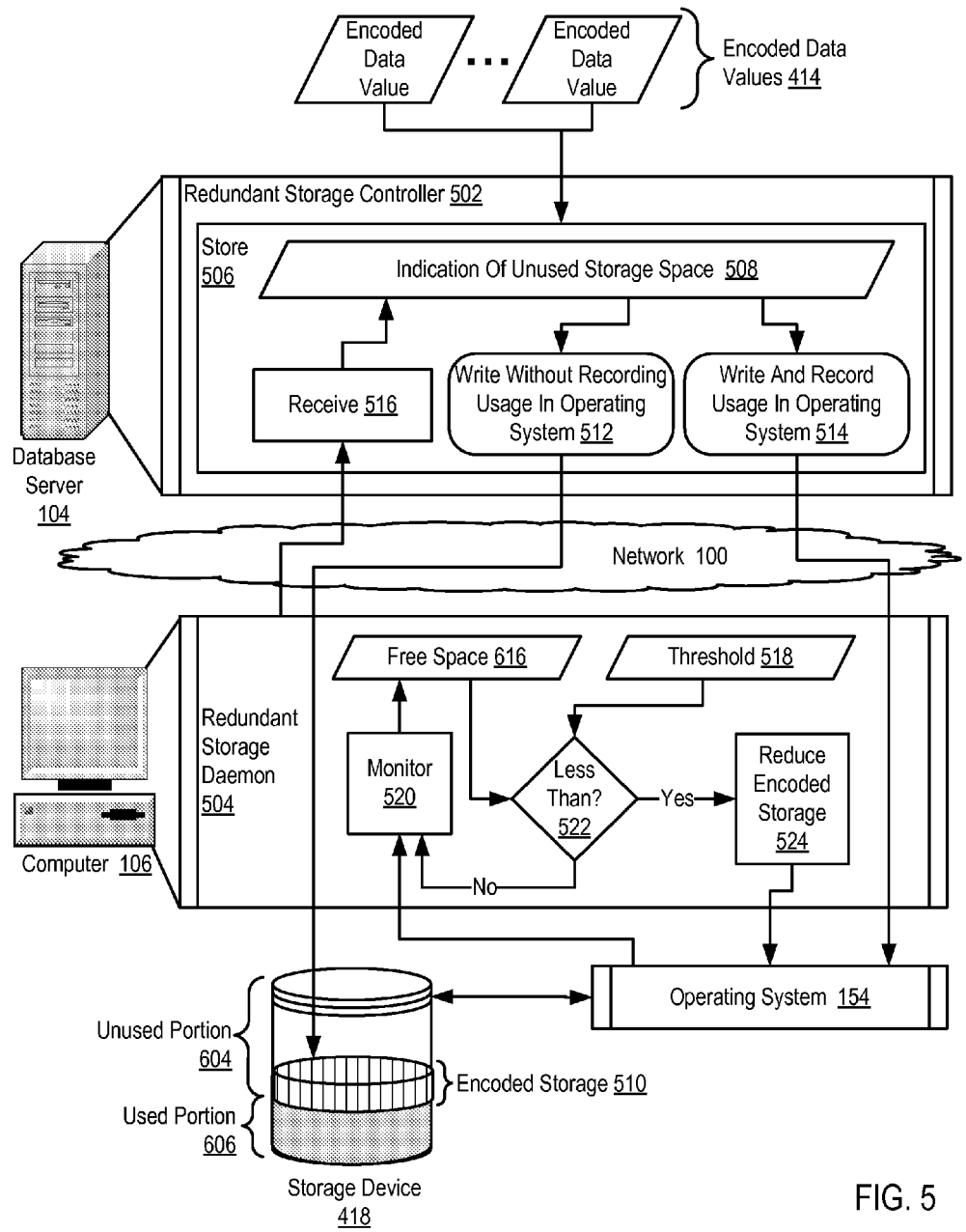
FIG. 5 sets forth a flow chart illustrating a further exemplary method for redundant storage of computer data according to embodiments of the present invention.

For further explanation, FIG. 5 sets forth a flow chart illustrating a further exemplary method for redundant storage of computer data according to embodiments of the present invention that includes storing (506) encoded data (414) by a redundant storage controller (502) to a redundant storage device (418) in a computer (106) coupled for data communications through a network (100) to the redundant storage controller (502). In this example, database server (104) serves as a source of data values for redundant storage, and computer (106) serves as a redundant storage resource. Database server (104) is coupled for data communications with computer (106) through data communications network (100). Redundant storage controller (502) is installed on database server (104). Redundant storage controller (502) is a software module containing computer program instructions for redundant storage of computer data according to embodiments of the present invention. Computer (106) includes a redundant storage daemon (504), a software module that carries out data communications with redundant storage controller (502) and other functions also, described in more detail below. Computer (106) also includes redundant storage device (418) and operating system (154).

The method of FIG. 5 also includes receiving (516) in a redundant storage controller (502) from a communicatively coupled computer (106) an indication (508) of a portion of unused storage space (604) on a redundant storage device (418). In this example, the redundant storage daemon (504) monitors the portion of unused storage space on redundant storage device (418) and periodically reports the portion of unused storage space to redundant storage controller (502) on database server (104).

In the example of FIG. 5, a redundant storage controller (502) stores (506) encoded data by writing (514) the encoded data (414) to an unused portion (604) of storage media on redundant storage device (418). Redundant storage device (418) is controlled by an operating system (154), including recording in the operating system that the portion of storage media is now in use for storage of encoded data (510). In the example of FIG. 5, the redundant storage daemon may monitor (520) the amount of free storage space on the redundant storage device (418) and reduce (524) encoded storage on the redundant storage device when free storage space (616) is less than a predetermined threshold amount (518). Monitoring (520) the amount of free storage space on the redundant storage device (418) may be carried out by calls to operating system (154), and reducing (524) encoded storage on the redundant storage device when free storage space (616) is less than a predetermined threshold amount (518) may be carried out by calling the operating system to delete data in encoded storage (510). In such a case, encoded storage (510) is in standard operating system file structures known to the operating system, but the redundant storage daemon reduces encoded storage without informing the redundant storage controller of the reduction, thereby implementing unreliable storage. Reliability is improved according to embodiments of the present invention with redundancy.

Alternatively in the example of FIG. 5, storing (506) encoded data may be carried out by writing (512) the encoded data (414) to an unused portion (606) of storage media on a redundant storage device (418), where the redundant storage device is controlled by an operating system (154), and the writing of the encoded data is implemented without recording in the operating system the fact that the portion of storage media now has encoded data stored upon the portion of storage media (510). Writing encoded data without recording storage media usage in the operating system may be carried out, for example, in hardware by a disk drive controller (not shown) which is controlled directly by a software module such as the redundant storage daemon (504) programmed to call the controller directly without calling the operating system, so that the operating system remains unaware of the encoded storage. Alternatively, the operating system may be provided with additional API ('Application Programming Interface') functions, or improved versions of current functions, that write encoded data to unused portions of storage media without recording the usage in the usual data structures of the operating system. Readers will recognize that encoded data written to unused portion of storage media risk being overwritten by the operating system's standard writing functions because the standard writing functions have no way of knowing that unused portions have in fact been 'used' to store encoded data. Again, this implements unreliable media with reliability improved with redundancy according to embodiments of the present invention.

Exemplary embodiments of the present invention are described largely in the context of a fully functional computer system for redundant storage of computer data. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for redundant storage of computer data, the system comprising a computer processor and a computer memory operatively coupled to the computer processor, the computer memory having disposed within it computer program instructions capable of:
   encoding N data values through M linear expressions into M encoded data values; and
   storing each encoded data value separately on one of M redundant storage devices;
   wherein M is greater than N and none of the linear expressions is linearly dependent upon any group of N−1 of the M linear expressions.

2. The system of claim 1 wherein storing further comprises storing by a redundant storage controller to a redundant storage device in a computer coupled for data communications through a network to the redundant storage controller.

3. The system of claim 1 further comprising computer program instructions capable of receiving in a redundant storage controller from a communicatively coupled computer an indication of a portion of unused storage space on a redundant storage device.

4. The system of claim 1 wherein storing further comprises writing the encoded data to an unused portion of storage media on a redundant storage device, the redundant storage device controlled by an operating system, the writing implemented without recording in the operating system that the portion of storage media now has encoded data stored upon the portion of storage media.

5. The system of claim 1 wherein storing further comprises:
   writing the encoded data to an unused portion of storage media on a redundant storage device that is controlled by an operating system, including recording in the operating system that the portion of storage media is now in use for storage of encoded data;
   monitoring the amount of free storage space on the redundant storage device; and
   reducing encoded storage on the redundant storage device when free storage space is less than a predetermined threshold amount.

6. A computer program product for redundant storage of computer data, the computer program product disposed upon a non-transmission medium, the computer program product comprising computer program instructions capable of:
   encoding N data values through M linear expressions into M encoded data values; and
   storing each encoded data value separately on one of M redundant storage devices;
   wherein M is greater than N and none of the linear expressions is linearly dependent upon any group of N−1 of the M linear expressions.

7. The computer program product of claim 6 wherein the signal bearing medium comprises a recordable medium.

8. The computer program product of claim 6 wherein the signal bearing medium comprises a transmission medium.

9. The computer program product of claim 6 wherein encoding N data values through M linear expressions into M encoded data values further comprises calculating values for the M linear expressions with Galois arithmetic.

10. The computer program product of claim 6 wherein encoding data values further comprises encoding data values in units of four bits per value.

11. The computer program product of claim 6 wherein storing further comprises storing by a redundant storage controller to a redundant storage device in a computer coupled for data communications through a network to the redundant storage controller.

* * * * *